United States Patent
Arima et al.

(10) Patent No.: US 6,890,109 B2
(45) Date of Patent: May 10, 2005

(54) OPTICAL FIBER SPLICER AND OPTICAL FIBER SPLICING METHOD

(75) Inventors: Tadao Arima, Kawasaki (JP); Osamu Saito, Kawasaki (JP); Shizuo Ishijima, Kawasaki (JP); Hideaki Terauchi, Kawasaki (JP); Manabu Tabata, Chiba (JP); Yoshinori Kanai, Chiba (JP); Noriyuki Kawanishi, Chiba (JP)

(73) Assignees: Fujitsu Limited, Kawasaki (JP); Fujikura Ltd., Tokyo (JP)

( * ) Notice: Subject to any disclaimer, the term of this patent is extended or adjusted under 35 U.S.C. 154(b) by 0 days.

(21) Appl. No.: 10/790,357

(22) Filed: Mar. 2, 2004

(65) Prior Publication Data

US 2004/0264892 A1 Dec. 30, 2004

(30) Foreign Application Priority Data

Jun. 26, 2003 (JP) ....................... 2003-182490

(51) Int. Cl.[7] .............................................. G02B 6/255
(52) U.S. Cl. ............................. 385/98; 385/95; 385/96; 385/97; 385/136; 385/137
(58) Field of Search ............................. 385/95, 96, 97, 385/98, 136, 137

(56) References Cited

U.S. PATENT DOCUMENTS

| | | | | |
|---|---|---|---|---|
| 4,049,414 A | * | 9/1977 | Smith .......................... | 65/407 |
| 5,076,881 A | * | 12/1991 | Ferguson ..................... | 156/436 |
| 5,151,964 A | * | 9/1992 | Carpenter et al. ............. | 385/98 |
| 5,155,787 A | * | 10/1992 | Carpenter et al. ............. | 385/98 |
| 5,191,632 A | * | 3/1993 | Mansfield et al. ........... | 385/134 |
| 5,309,538 A | * | 5/1994 | Larson ........................ | 385/98 |
| 6,152,611 A | | 11/2000 | Mardirossian ............... | 385/99 |
| 6,767,144 B2 | * | 7/2004 | Yablon ........................ | 385/95 |
| 2002/0009271 A1 | * | 1/2002 | Herve et al. ................. | 385/98 |
| 2004/0005126 A1 | * | 1/2004 | Yablon ........................ | 385/95 |
| 2004/0264892 A1 | | 12/2004 | Arima et al. ................. | 385/97 |

FOREIGN PATENT DOCUMENTS

| | | | | |
|---|---|---|---|---|
| JP | 02-028604 | 1/1990 | ............... | 385/95 X |
| JP | 02-044037 | 2/1990 | ............... | 385/95 X |
| JP | 2001-344503 | 12/2001 | ............... | 395/95 X |
| JP | 2002-247173 | 8/2002 | ............... | 385/95 X |

* cited by examiner

*Primary Examiner*—Brian M. Healy
(74) *Attorney, Agent, or Firm*—Staas & Halsey LLP

(57) ABSTRACT

An optical fiber splicer for splicing a plurality of first optical fibers arranged in spaced relationship with each other and a plurality of second optical fibers arranged in opposed relationship with the first optical fibers. The optical fiber splicer includes an XY table movable in XY directions orthogonal to each other, a tray mounted on the XY table, and first and second clamps for respectively clamping a selected one of the first optical fibers and a selected one of the second optical fibers to be spliced to the selected first optical fiber. The optical fiber splicer further includes first and second electrodes extending vertically and aligned with each other, first and second cameras located so as to interpose the first electrode, and an image processing unit for processing images picked up by the first and second cameras.

20 Claims, 15 Drawing Sheets

OPTICAL FIBER SPLICER AND OPTICAL FIBER SPLICING METHOD

BACKGROUND OF THE INVENTION

1. Field of the Invention

The present invent ion relates to an optical fiber splicer and a n optical fiber splicing method which can splice a plurality of pairs of optical fibers continuously and automatically.

2. Description of the Related Art

In a conventional method of assembling an optical module such as an optical amplifier, optical fibers extending from optical components are routed to connection points and forming of the optical fibers is next performed prior to the fusion splicing. As the number of optical components increases, the routing of optical fibers become more complicated and the connection of optical fibers also becomes more troublesome because of increased connection points and precise position adjustment between optical fibers to be connected. To make the assembly of an optical module efficient, the use of a fiber sheet in the optical module is being considered.

In the case of assembling an optical module by using a fiber sheet, an optical fiber extending from the fiber sheet is connected to an optical fiber extending from an optical component. At this time, it is preferable to reduce the length of each optical fiber to be spliced from the viewpoints of mounting limitation and workability. The use of such a fiber sheet including optical fibers wired so as to correspond to the connecting relation between optical components can eliminate the need for an extra fiber length for connection of the optical components. However, in a conventional optical fiber splicer, it is difficult to connect short optical fibers, and in particular difficult to continuously and automatically connect short optical fibers.

The conventional optical fiber splicer includes a pair of electrodes and a pair of monitor cameras arranged in orthogonal relationship with the electrodes. Accordingly, it is impossible to ensure a plane space allowing the movement of optical fibers or the like between the electrodes. Further, since the electrodes are arranged horizontally, the ends of a plurality of adjacent optical fibers cannot be positioned between the electrodes by the horizontal movement of a plurality of pairs of optical fibers to be spliced. Further, in a short optical fiber connected at its one end to an optical component or a fiber sheet, there is a possibility that the optical fiber may be extremely bent to cause damage in performing longitudinal push adjustment. It is difficult for the conventional optical fiber splicer to overcome this problem.

SUMMARY OF THE INVENTION

It is therefore an object of the present invention to provide an optical fiber splicer which can splice a plurality of pairs of optical fibers opposed to each other continuously and automatically.

It is another object of the present invention to provide an optical fiber splicing method which can splice a plurality of pairs of optical fibers continuously and automatically.

In accordance with an aspect of the present invention, there is provided an optical fiber splicer for splicing a plurality of first optical fibers arranged in spaced relationship with each other and a plurality of second optical fibers arranged in opposed relationship with the first optical fibers, the optical fiber splicer including an XY table movable in an X direction and a Y direction orthogonal to the X direction; a tray mounted on the XY table; element for fixing the first and second optical fibers to the tray so that the first and second optical fibers are opposed to each other in close relationship; first and second clamp element for respectively clamping a selected one of the first optical fibers and a selected one of the second optical fibers to be spliced to the selected first optical fiber; a first electrode extending vertically and movable vertically; a second electrode aligned with the first electrode at a position above the first electrode, the second electrode extending vertically and movable vertically; a first camera provided on one side of the first electrode in a direction orthogonal to a direction of extension of the selected first and second optical fibers; a second camera provided on the other side of the first electrode opposite to the first camera in a direction orthogonal to the direction of extension of the selected first and second optical fibers; and element for processing images picked up by the first and second cameras.

Preferably, the optical fiber splicer further includes a fiber lifting mechanism for lifting the plurality of first and second optical fibers, and an electrode retracting mechanism for moving the first and second electrodes away from each other. The fiber lifting mechanism includes a first lifting bar extending below the plurality of first optical fibers in a direction orthogonal to the direction of extension of the first optical fibers, the first lifting bar having a curved upper surface for bending the first optical fibers; and a second lifting bar extending below the plurality of second optical fibers in a direction orthogonal to the direction of extension of the second optical fibers, the second lifting bar having a curved upper surface for bending the second optical fibers.

Each of the first and second clamp element includes a lower clamp having a V groove and an upper clamp having a projection complementary in shape to the V groove. Each lower clamp is movable both in a horizontal plane and in a vertical plane. Preferably, the optical fiber splicer further includes a clamp interlocking mechanism for interlocking the lower clamp and the upper clamp.

For example, the plurality of first optical fibers are connected at their one ends to a plurality of optical components mounted on a substrate, and the plurality of second optical fibers are sandwiched between first and second resin sheets of a fiber sheet and project from between the first and second resin sheets. The first and second cameras are located so that the optical axes of the first and second cameras intersect at right angles. Preferably, the optical fiber splicer further includes a fine adjusting mechanism provided integrally with the lower clamp in each of the first and second clamp element.

In accordance with another aspect of the present invention, there is provided an optical fiber splicing method including the steps of arranging a plurality of first optical fibers in spaced relationship with each other; arranging a plurality of second optical fibers at one end of each of the second optical fibers in opposed relationship with one end of each of the first optical fibers; clamping an end portion of a selected one of the first optical fibers and an end portion of a selected one of the second optical fibers to be spliced to the selected first optical fiber, and simultaneously forming bent portions near the end portions of the selected first and second optical fibers; extending the bent portions of the selected first and second optical fibers clamped to thereby move the end faces of the selected first and second optical fibers toward each other; performing pre-discharging by element of first and second electrodes extending vertically and aligned with each other to thereby clean the end portions of the selected first and second optical fibers clamped; aligning the optical axes of the selected first and second optical fibers clamped; and performing discharging by element of the first and second electrodes to splice the selected first and second optical fibers clamped.

In accordance with a further aspect of the present invention, there is provided an optical fiber splicing method including the steps of mounting a tray on an XY table; fixing to the tray an optical assembly having a substrate, a plurality of optical components mounted on the substrate, and a plurality of first optical fibers connected at their one ends to the optical components and arranged in spaced relationship with each other; fixing to the tray a fiber sheet having first and second resin sheets and a plurality of second optical fibers sandwiched between the first and second resin sheets so as to be opposed to the first optical fibers; clamping an end portion of a selected one of the first optical fibers and an end portion of a selected one of the second optical fibers to be spliced to the selected first optical fiber, and simultaneously forming bent portions near the end portions of the selected first and second optical fibers; extending the bent portions of the selected first and second optical fibers clamped to thereby move the end faces of the selected first and second optical fibers toward each other; performing pre-discharging by element of first and second electrodes extending vertically and aligned with each other to thereby clean the end portions of the selected first and second optical fibers clamped; aligning the optical axes of the selected first and second optical fibers clamped; and performing discharging by element of the first and second electrodes to splice the selected first and second optical fibers clamped.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
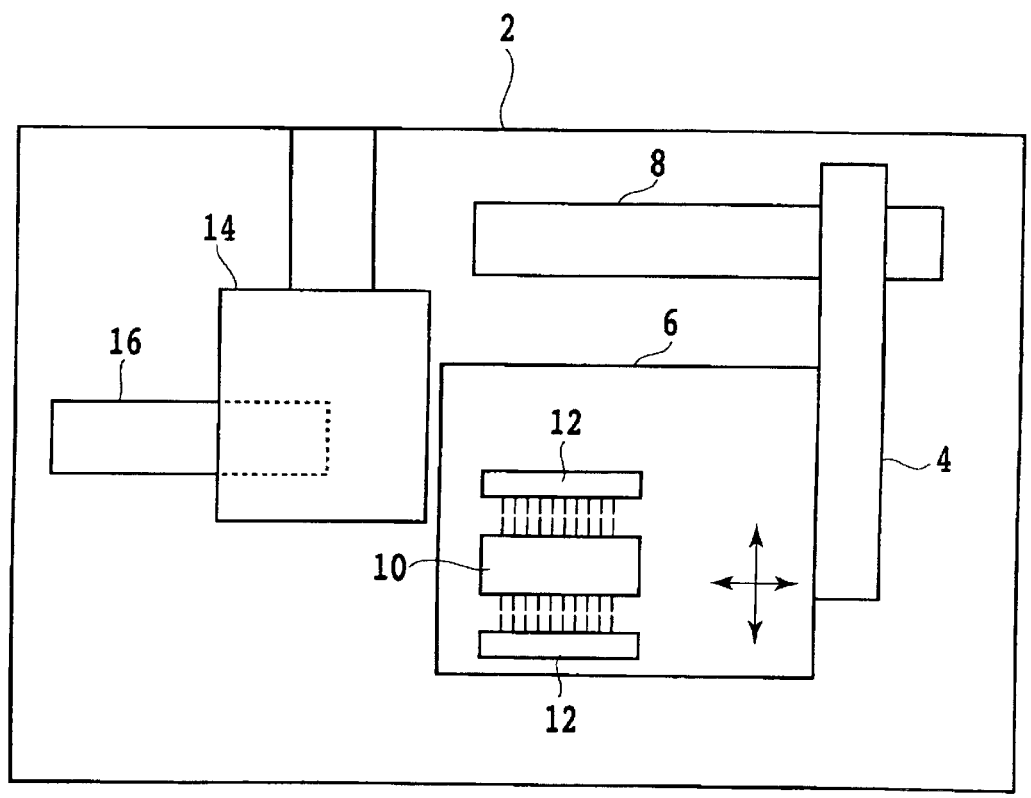
FIG. 1 is a schematic plan view showing the arrangement of an optical fiber splicer according to a preferred embodiment of the present invention.

Referring to FIG. 1, there is shown a schematic arrangement of an optical fiber splicer according to a preferred embodiment of the present invention. Reference numeral 2 denotes a base, on which an XY table 4 is mounted so as to be movable in an X direction and a Y direction orthogonal to the X direction. In other words, the XY table 4 can be moved in the X direction and the Y direction by an XY table feeding mechanism 8. A tray 6 is fixed to the XY table 4. An optical assembly 10 and a pair of fiber sheets 12 are fixed to the tray 6. The optical assembly 10 and each fiber sheet 12 have a plurality of pairs of optical fibers to be spliced.

A splicing head (upper head) 14 is mounted on the base 2, and a fiber lifting mechanism 16 is provided in the vicinity of the splicing head 14. In splicing the optical fibers of the optical assembly 10 and the fiber sheets 12, the XY table 4 is driven by the XY table feeding mechanism 8 to thereby move the optical assembly 10 and the fiber sheets 12 mounted on the tray 6 to the position under the splicing head 14.

Figure 2:
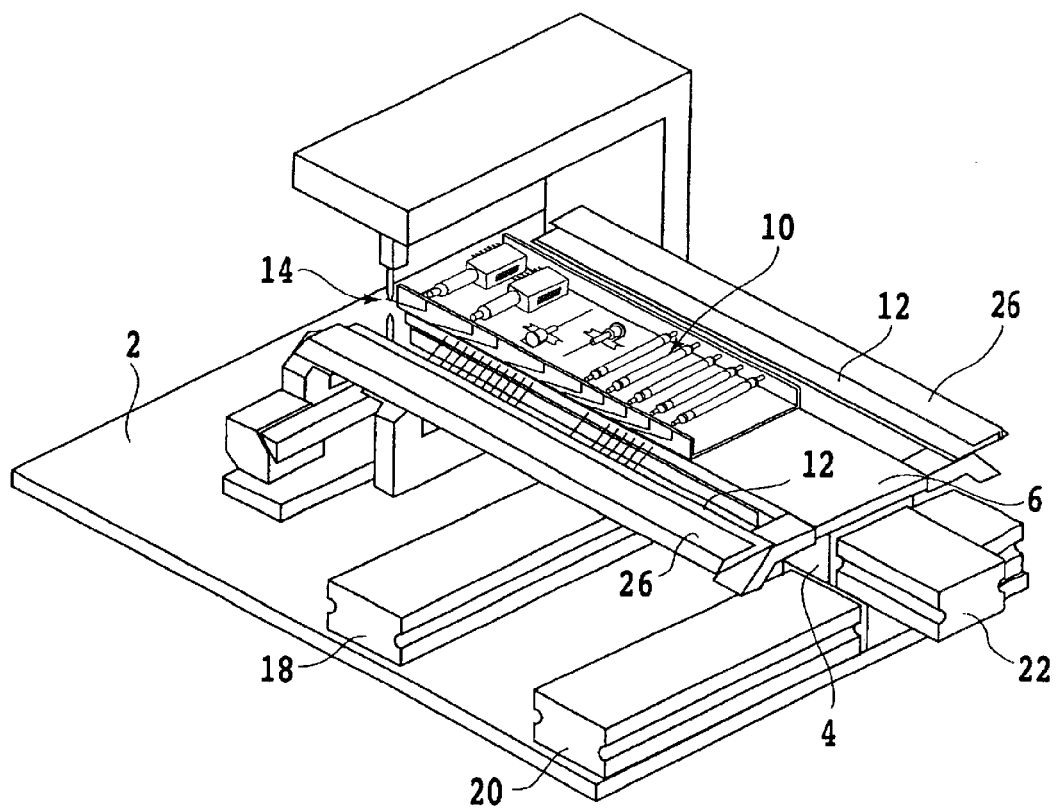
FIG. 2 is a schematic perspective view of this preferred embodiment.

FIG. 2 is a schematic perspective view of the preferred embodiment. A pair of Y rails 18 and 20 are fixed to the base 2, and an X rail 22 is mounted on the Y rails 18 and 20 so as to be movable in the Y direction. The XY table 4 is mounted on the X rail 22 so as to be movable in the X direction. The tray 6 is fixedly mounted on the XY table 4. The optical assembly 10 and the fiber sheets 12 each having a plurality of optical fibers are fixed to the tray 6. Reference numeral 26 denotes a fixing member for fixing the fiber sheets to the tray 6.

Figure 3:
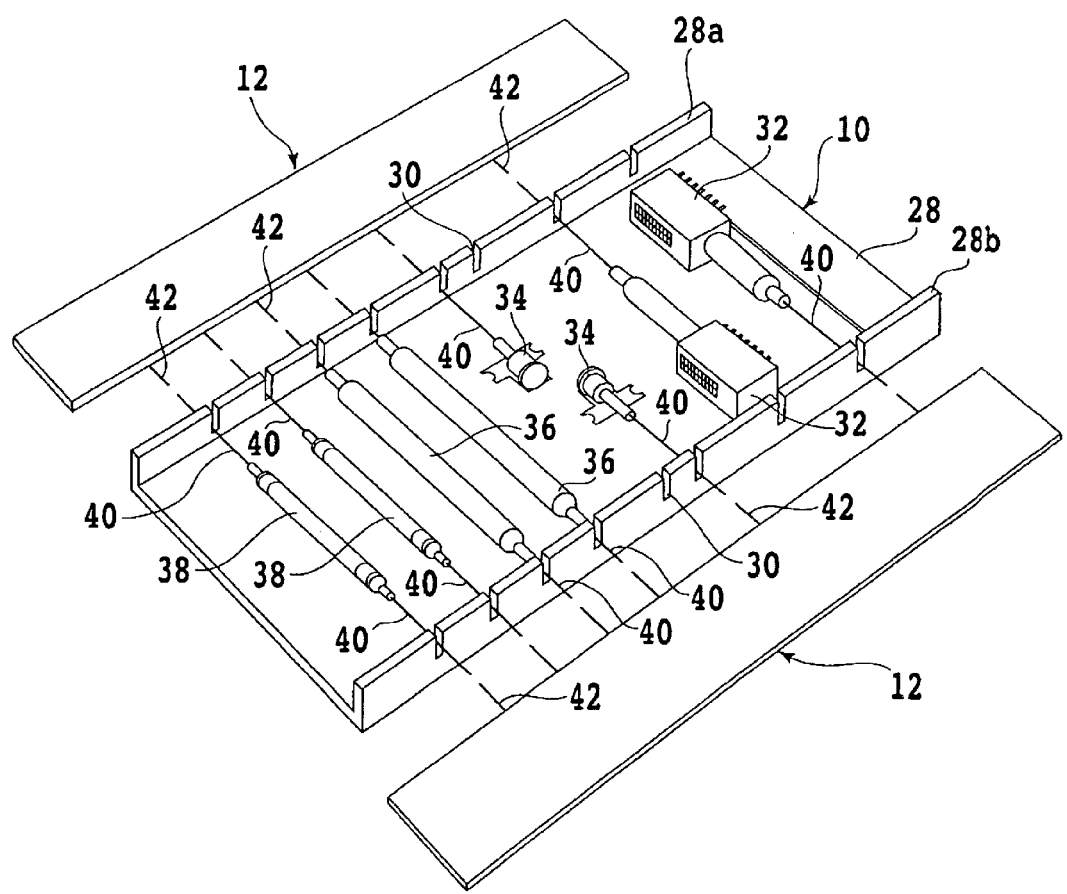
FIG. 3 is a perspective view showing the arrangement of an optical assembly and fiber sheets.

Referring to FIG. 3, there is shown a perspective view of the arrangement of the optical assembly 10 and the fiber sheets 12 in splicing the optical fibers. Reference numeral 28 denotes an optical component mounting substrate of the optical assembly 10. The substrate 28 has a pair of side walls 28a and 28b. Each of the side walls 28a and 28b is formed with a plurality of fiber positioning recesses 30. The substrate 28 is formed of a synthetic resin, for example. Preferably, the bottoms of all the fiber positioning recesses 30 of the side walls 28a and 28b are in substantially the same plane.

A plurality of optical components including pumping laser diodes 32, monitoring photodiodes 34, optical couplers 36, and optical isolators 38 are mounted on the substrate 28.

An optical fiber 40 for inputting or outputting an optical signal is connected to one end of each of the laser diodes 32 and the photodiodes 34, and optical fibers 40 are connected to both ends of each of the optical couplers 36 and the optical isolators 38. These optical fibers 40 are inserted in the fiber positioning recesses 30 of the side walls 28a and 28b of the substrate 28 and positioned therein. As mentioned above, the bottoms of the fiber positioning recesses 30 are in substantially the same plane, so that the optical fibers 40 inserted in the fiber positioning recesses 30 and projecting therefrom are aligned as viewed in side elevation.

Figure 4:
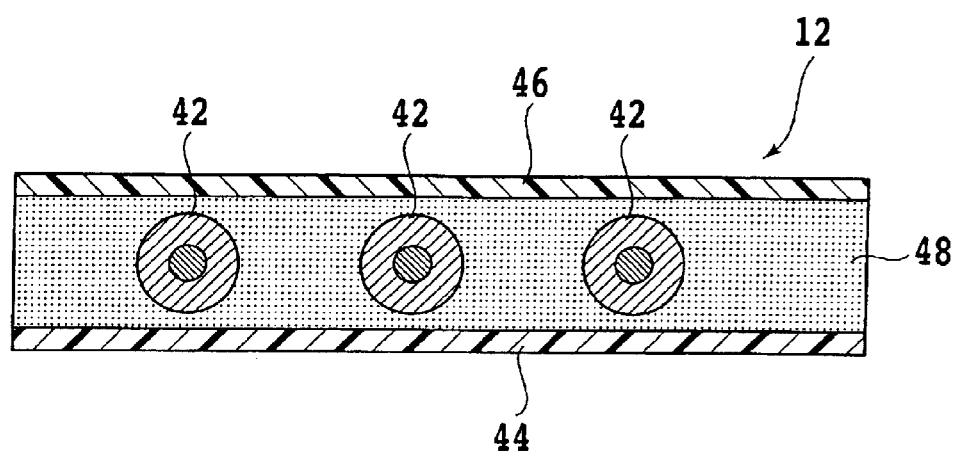
FIG. 4 is a sectional view of each fiber sheet.

The fiber sheets 12 are located on the opposite sides of the optical assembly 10, and each fiber sheet 12 has a plurality of optical fibers 42 to be spliced to the optical fibers 40 of the optical assembly 10. As shown in FIG. 4, each fiber sheet 12 is composed of a first resin sheet 44 having an adhesive layer 48 on one side, a plurality of optical fibers 42 wired on the adhesive layer 48 of the first resin sheet 44, and a second resin sheet 46 attached to the first resin sheet 44 so that the optical fibers 42 are sandwiched between the first and second resin sheets 44 and 46. Each of the resin sheets 44 and 46 is formed from a polyimide film, for example. The adhesive layer 48 is formed of a pressure-sensitive adhesive such as rubber elastomer or rosin. The optical fibers 42 are preliminarily wired on the adhesive layer 48 of the first resin sheet 44 so as to correspond to the connecting relation between the optical components 32, 34, 36, and 38.

The optical fibers 42 of each fiber sheet 12 project from between the first and second resin sheets 44 and 46, and the projecting end portions of the optical fibers 42 are spaced apart from each other. The coatings of the optical fibers 42 at their end portions are removed simultaneously and cleaned, and the end faces of the optical fibers 42 at their bare portions are cut. Similarly, the optical fibers 40 of the optical assembly 10 are also processed at their end portions. In this condition, the optical assembly 10 and the fiber sheets 12 are fixed to the tray 6 so that each pair of optical fibers 40 and 42 face together in close relationship. The length of each projecting portion of the optical fibers 40 and 42 of the optical assembly 10 and the fiber sheets 12 is set to 15 to 30 mm, whereby the end faces of the optical fibers 40 and 42 in each pair can be located at substantially constant positions with good reproducibility without the need for forming of the optical fibers.

Figure 5:
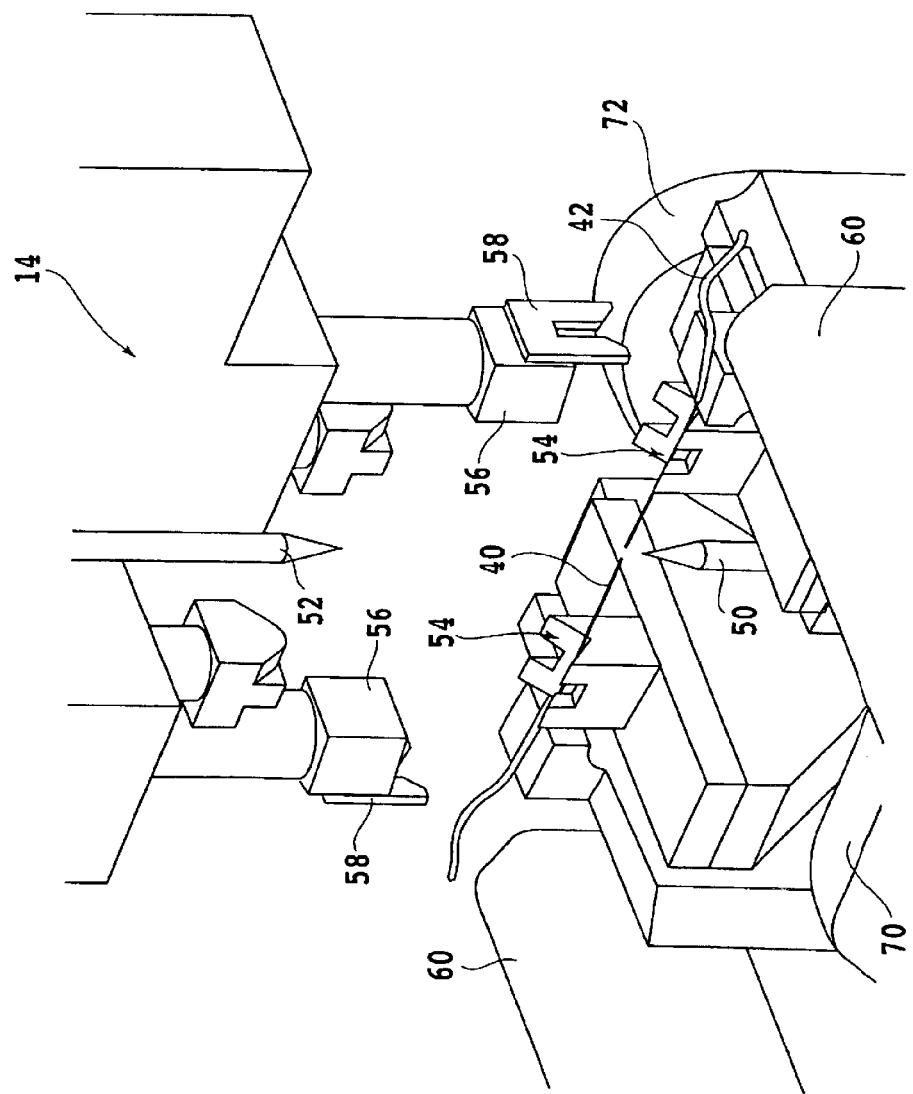
FIG. 5 is a perspective view showing an essential part of the preferred embodiment.

FIG. 5 is a perspective view of an essential part of the optical fiber splicer according to this preferred embodiment. A lower electrode (first electrode) 50 extends vertically. The lower electrode 50 is movable vertically between a splicing position (upper position) and a retracted position (lower position). An upper electrode (second electrode) 52 extends vertically at a position above the lower electrode 50 so as to be aligned with the lower electrode 50. The upper electrode 52 is also movable vertically between a splicing position (lower position) and a retracted position (upper position).

A pair of lower clamps 54 for clamping the optical fibers 40 and 42 to be spliced are located on the opposite sides of the lower electrode 50 in a direction of extension of the optical fibers 40 and 42. Each lower clamp 54 has a V groove. The lower electrode 50 and the lower clamps 54 are mounted on a common casing. A pair of upper clamps 56 are mounted on the splicing head (upper head) 14 so as to be respectively opposed to the lower clamps 54. Each upper clamp 56 has a projection complementary in shape to the V groove of each lower clamp 54.

A guide plate 58 having a V-shaped recess is mounted on each upper clamp 56, so as to correct for the end positions of the optical fibers 40 and 42. A pair of CCD cameras (first and second cameras) 70 and 72 are located on the opposite sides of the lower electrode 50 in a direction orthogonal to the direction of extension of the optical fibers 40 and 42. The first and second CCD cameras 70 and 72 are arranged so that their optical axes intersect at right angles.

Figure 6:
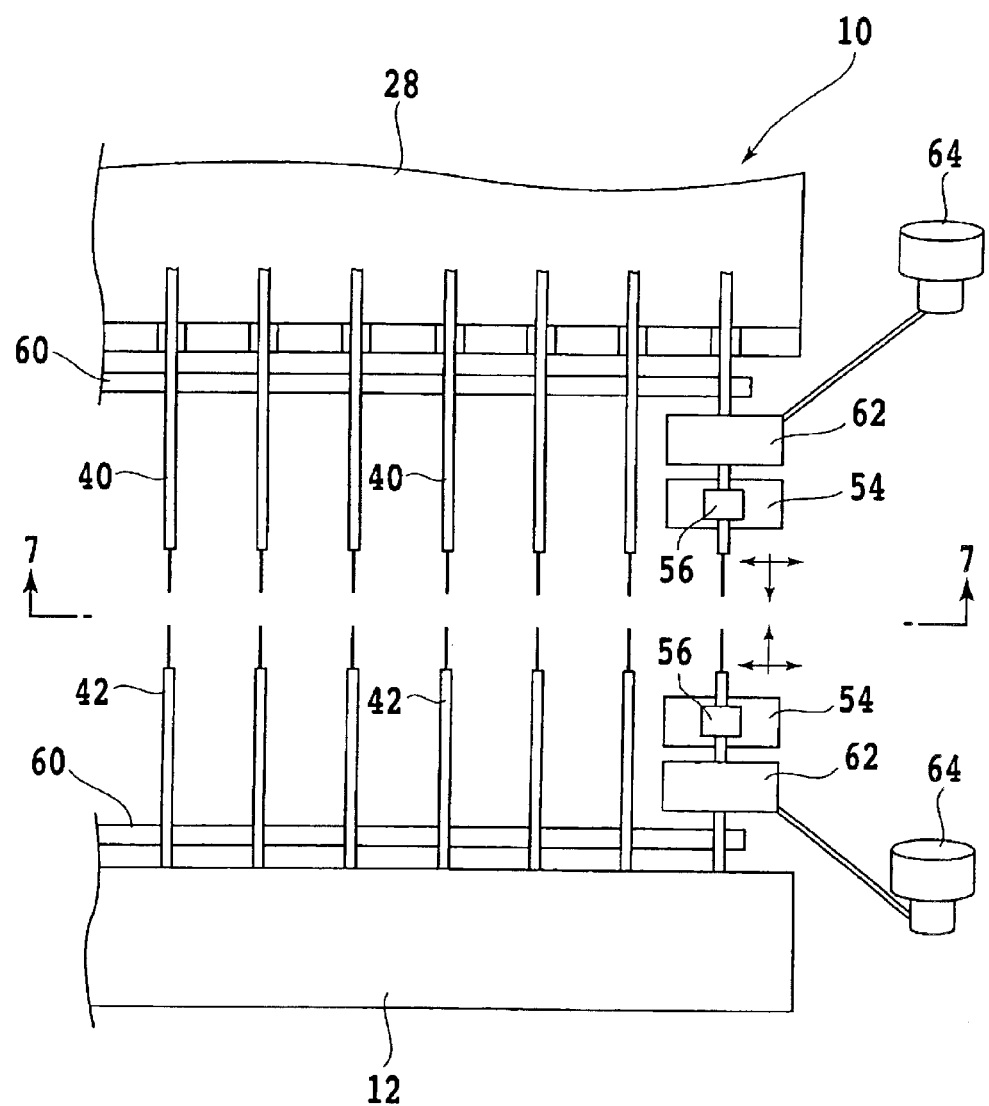
FIG. 6 is a plan view showing an essential part of the preferred embodiment.
Figure 7:
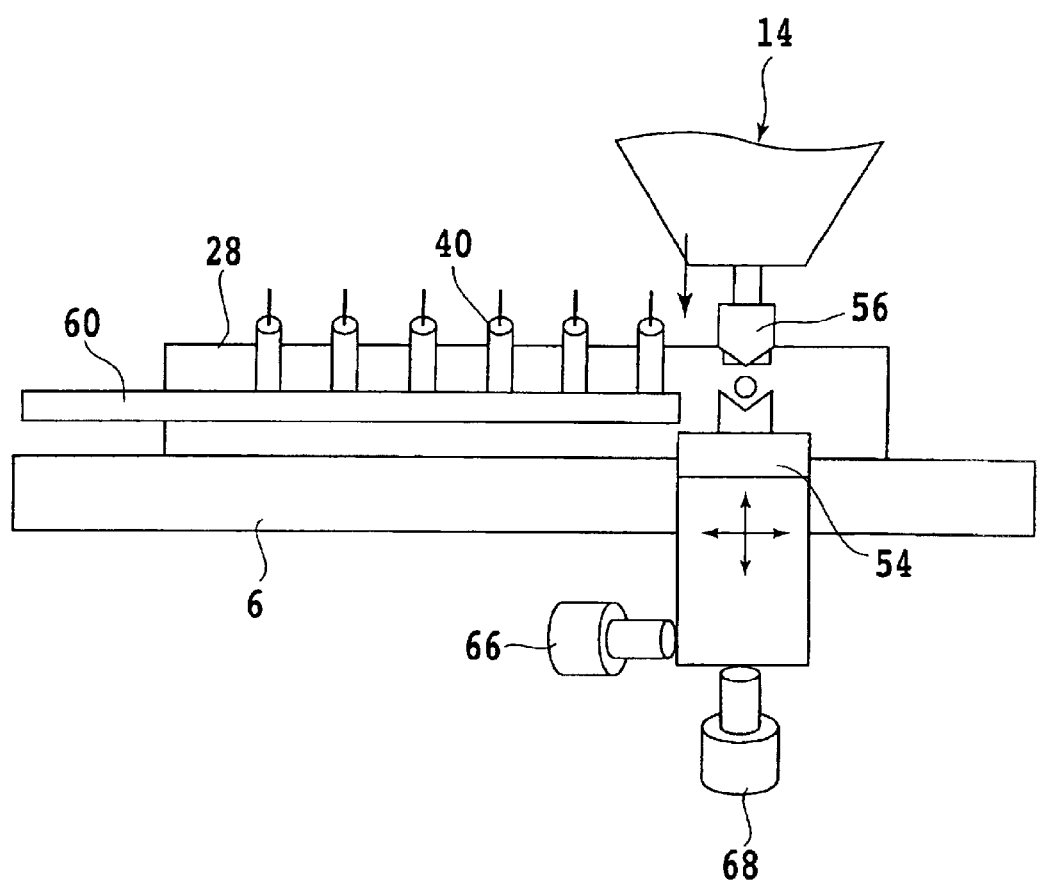
FIG. 7 is a cross section taken along the line 7—7 in FIG. 6.
Figure 8:
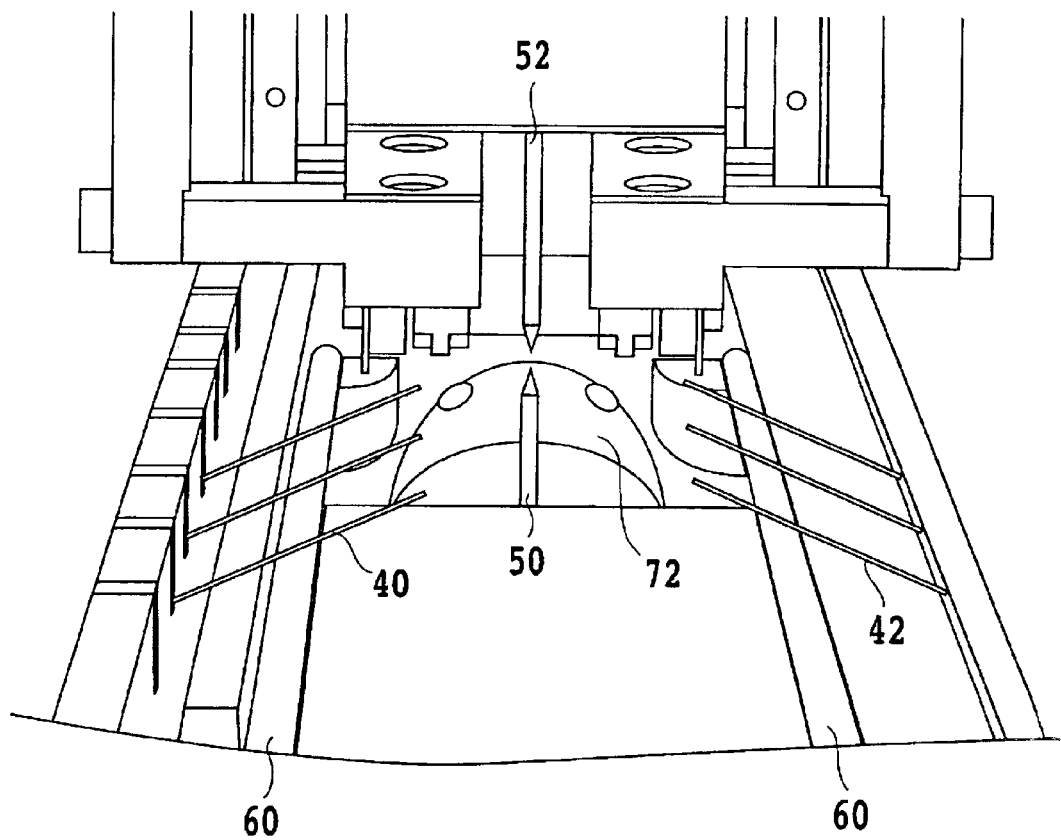
FIG. 8 is a perspective view showing an essential part of the preferred embodiment.
Figure 9:
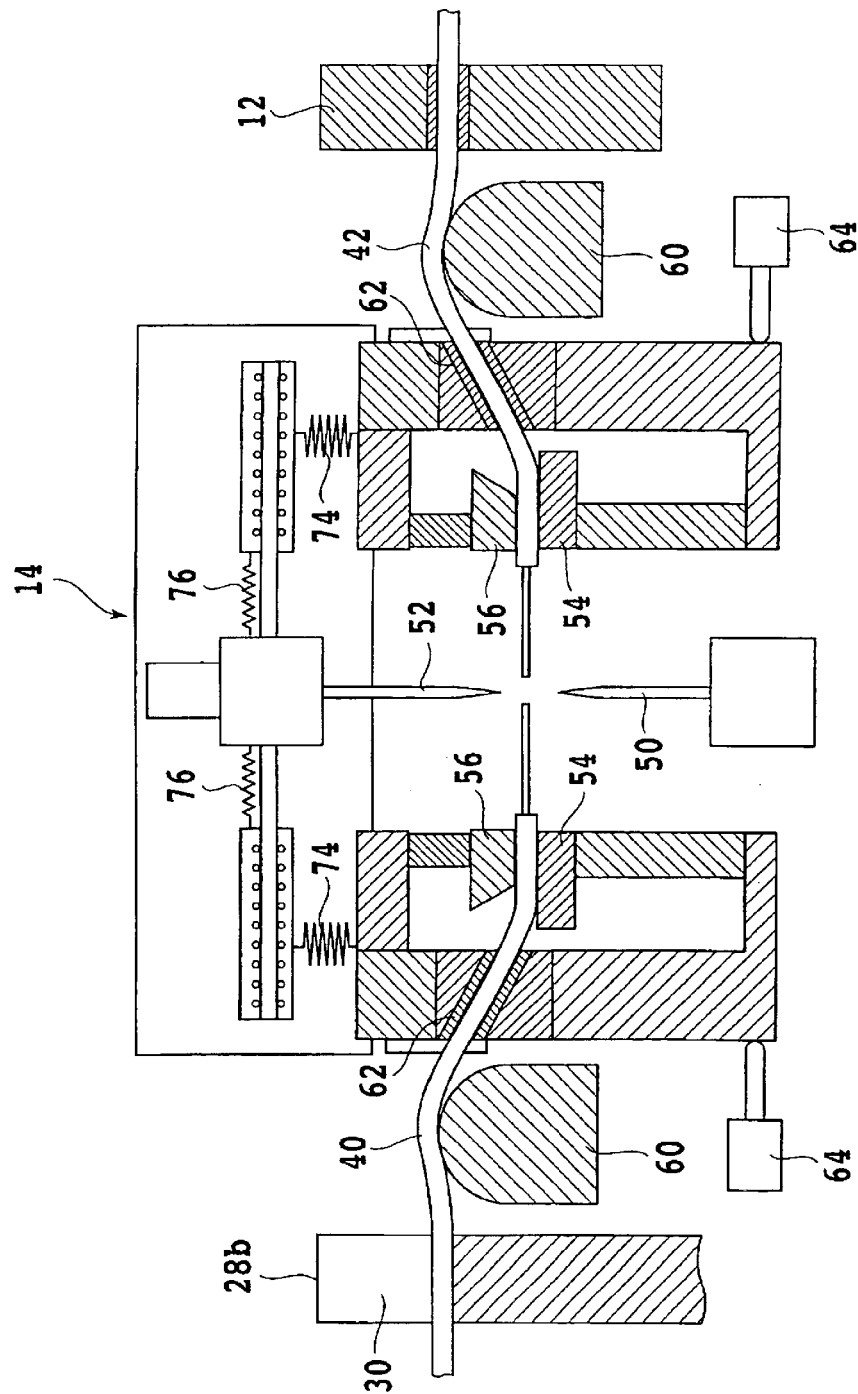
FIG. 9 is a sectional view of the preferred embodiment.

Referring to FIG. 6, there is shown a plan view of an essential part in this preferred embodiment. FIG. 7 is a view taken along the line 7—7 in FIG. 6. A pair of lifting bars 60 constituting the fiber lifting mechanism 16 shown in FIG. 1 are located below the optical fibers 40 and 42. As best shown in FIG. 9, each lifting bar 60 has a curved upper surface. As shown in FIGS. 7 and 8, the opposed end portions of the optical fibers 40 and 42 are lifted by the lifting bars 60. The reason for this lifting is to prevent that the optical fibers 40 and 42 may come into contact with each other or any other members before splicing, causing the damage to the optical fibers 40 and 42.

A pair of sheath clamps 62 for holding the coatings of the optical fibers 40 and 42 are provided adjacent to the pair of upper and lower clamps 56 and 54, respectively. A stepping motor 64 is provided to move the lower clamp 54 and the sheath clamp 62 in each pair in the Y direction (the direction of extension of the optical fibers). Another stepping motor 66 shown in FIG. 7 is provided to move the lower clamp 54 and the sheath clamp 62 in each pair in the X direction orthogonal to the Y direction. Further, another stepping motor 68 shown in FIG. 7 is provided to move the lower clamp 54 and the sheath clamp 62 in each pair in a Z direction orthogonal to both the X direction and the Y direction. These stepping motors 64, 66, and 68 are provided integrally with the lower clamp 54 in each pair, and constitute a fine adjusting mechanism to be operated in aligning the optical axes of the optical fibers 40 and 42.

FIG. 9 is a sectional view of the preferred embodiment. The end portions of the optical fibers 40 and 42 opposed to each other are clamped by the pair of upper and lower clamps 56 and 54 and the pair of sheath clamps 62, respectively. As a result, each of the optical fibers 40 and 42 is bent by the corresponding lifting bars 60. Each upper clamp 56 is normally biased downward by a compression spring 74. Further, each upper clamp 56 is normally biased by a compression spring 76 in a direction moving away from the upper electrode 52. The upper electrode 52 is movable only in the vertical direction.

Figure 10:
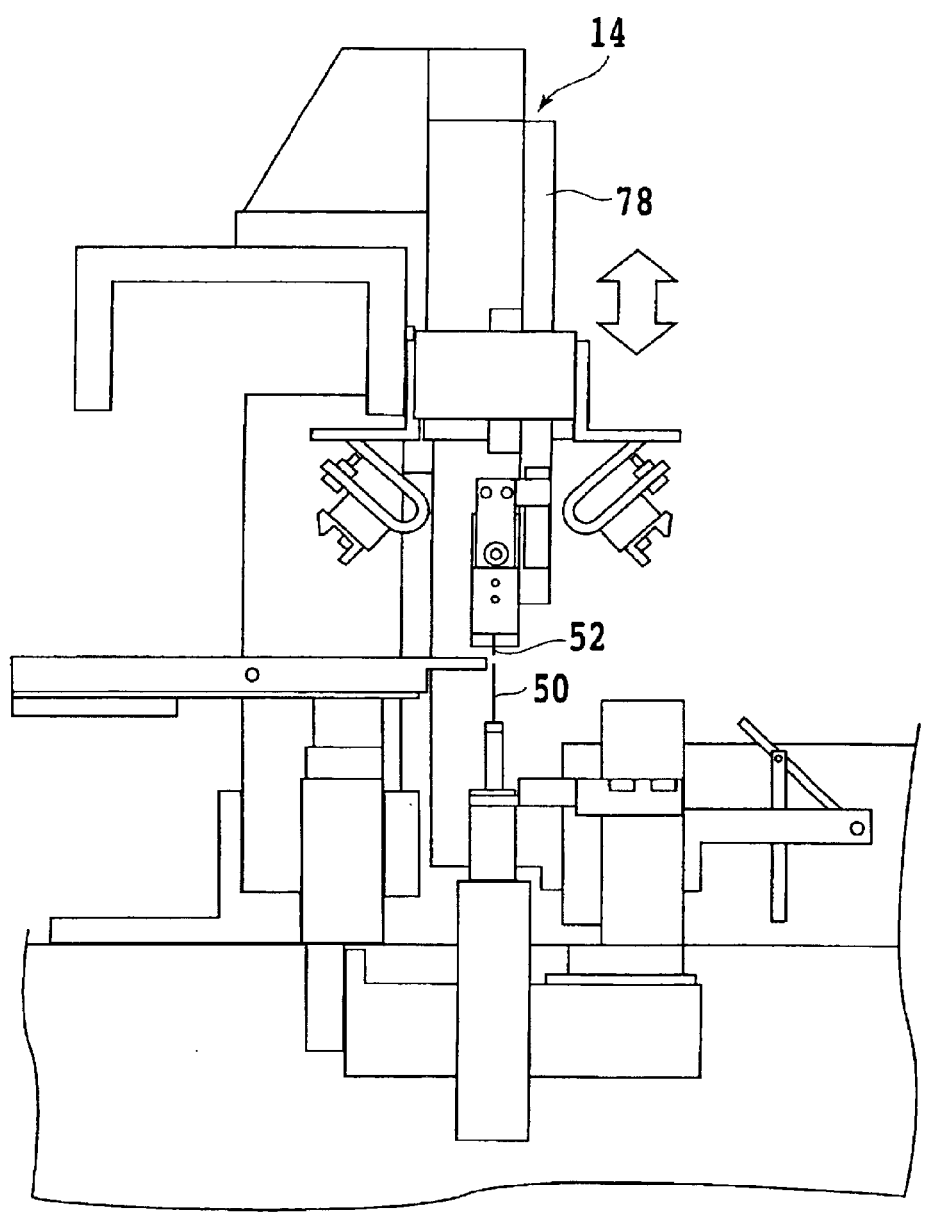
FIG. 10 is an elevational view showing an upper head driving mechanism in a condition where an upper head is lowered.
Figure 11:
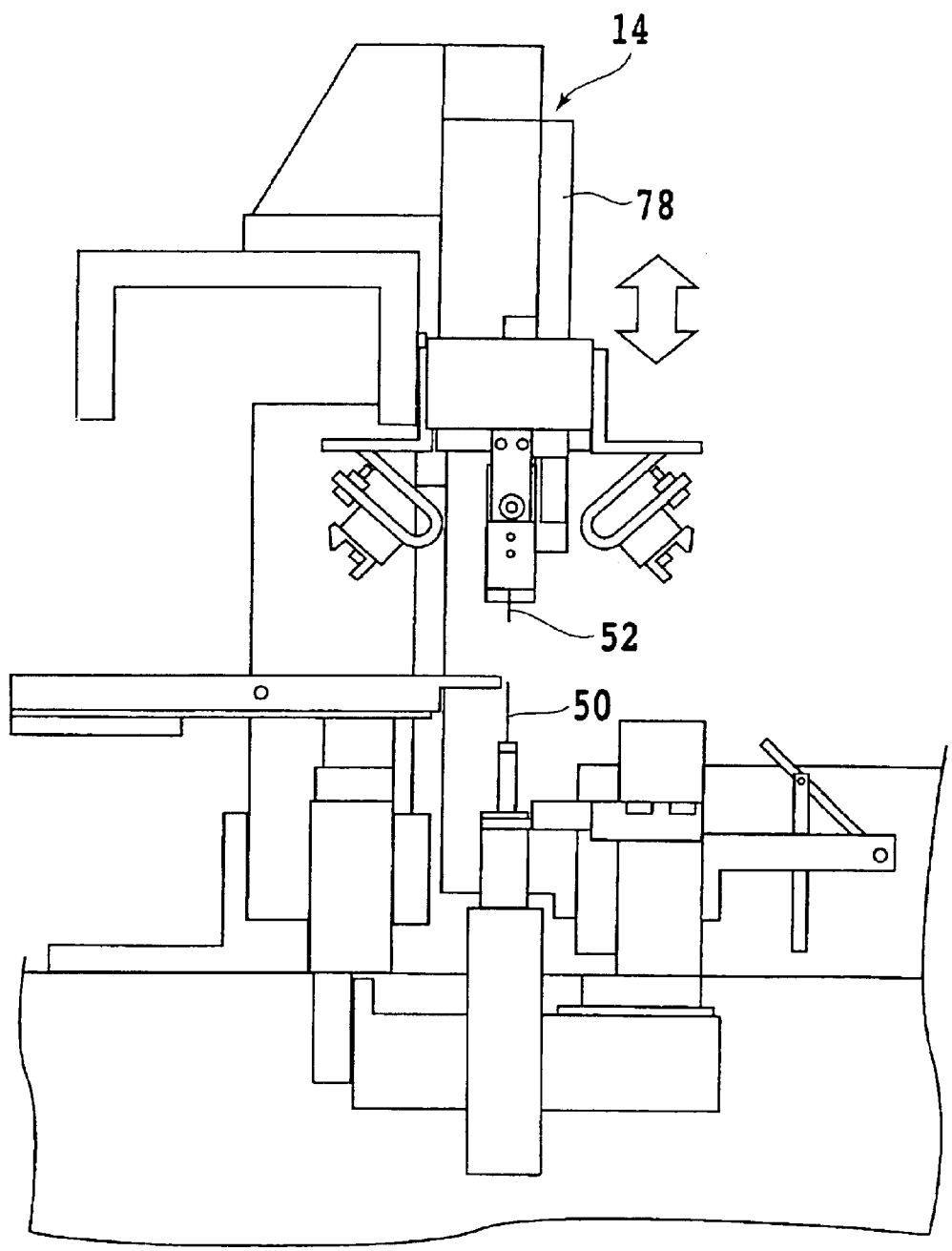
FIG. 11 is a view similar to FIG. 10, showing a condition where the upper head is raised.

FIG. 10 shows a condition where the upper head 14 is in a lower position for splicing of the optical fibers 40 and 42, and FIG. 11 shows a condition where the upper head 14 is in an upper position for retraction of the upper electrode 52. An air cylinder 78 is used as a driving mechanism for the upper head 14.

Figure 12:
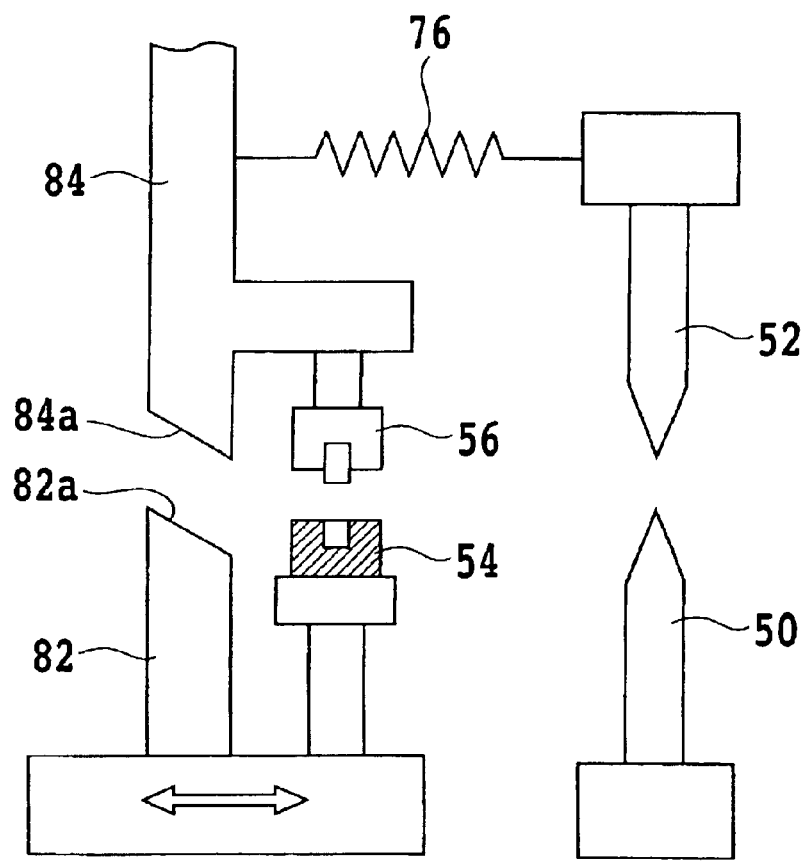
FIG. 12 is a schematic elevation showing a clamp interlocking mechanism.

Referring to FIG. 12, there is shown a schematic view of a clamp interlocking mechanism for interlocking the upper and lower clamps 56 and 54. A member 82 is integrally connected with the lower clamp 54, and the member 82 has an inclined upper surface 82a. On the other hand, a member 84 is integrally connected with the upper clamp 56, and the member 84 has an inclined lower surface 84a complementary to the inclined upper surface 82a of the member 82. Before clamping, the upper clamp 56 and the member 84 are biased leftward as viewed in FIG. 12 by the compression spring 76. The lower clamp 54 and the member 82 are moved leftward as viewed in FIG. 12 by a stepping motor, and the upper clamp 56 is next lowered by an air cylinder to thereby allow proper engagement of the upper and lower clamps 56 and 54.

The optical fibers 40 and 42 are clamped by the upper and lower clamps 56 and 54. At the same time, the inclined upper surface 82a and the inclined lower surface 84a are brought into pressure contact with each other by an air cylinder. Rubber members are attached to the inclined surfaces 82a and 84a, so that a frictional force generated between the inclined surfaces 82a and 84a is sufficiently larger than the biasing force of the compression spring 76. Accordingly, when the lower clamp 54 and the member 82 are moved horizontally after clamping, the upper clamp 56 and the member 84 are also moved horizontally in interlocking relationship with the lower clamp 54 and the member 82 through the inclined surfaces 82a and 84a.

Figure 13A:
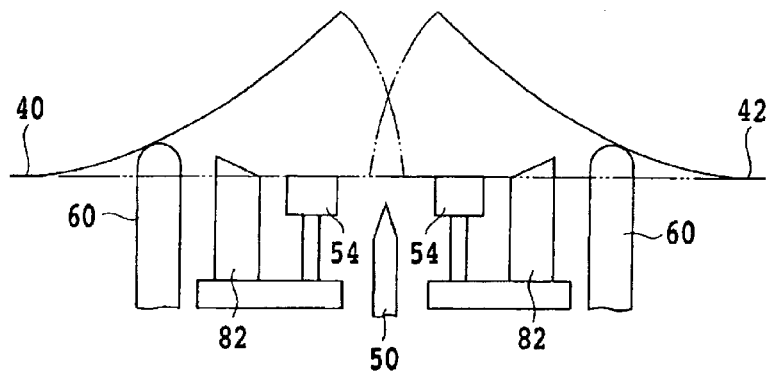
FIG. 13A is a schematic elevation showing a condition where end portions of optical fibers to be spliced are lifted by lifting bars.
Figure 13B:
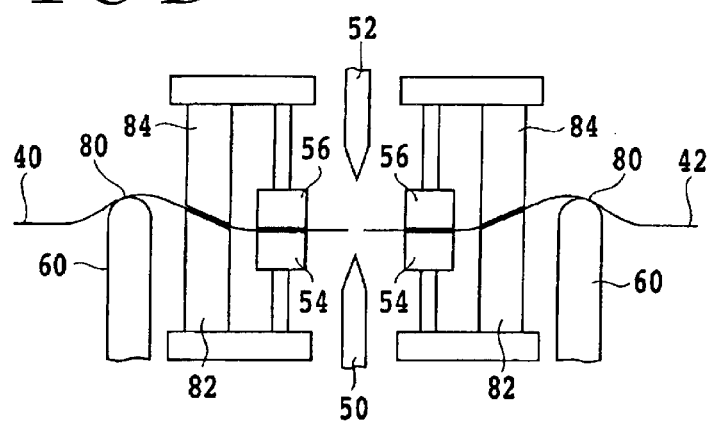
FIG. 13B is a view similar to FIG. 13A, showing a condition where the end portions of the optical fibers are clamped and bent portions are simultaneously formed near the end portions of the optical fibers by the lifting bars.
Figure 13C:
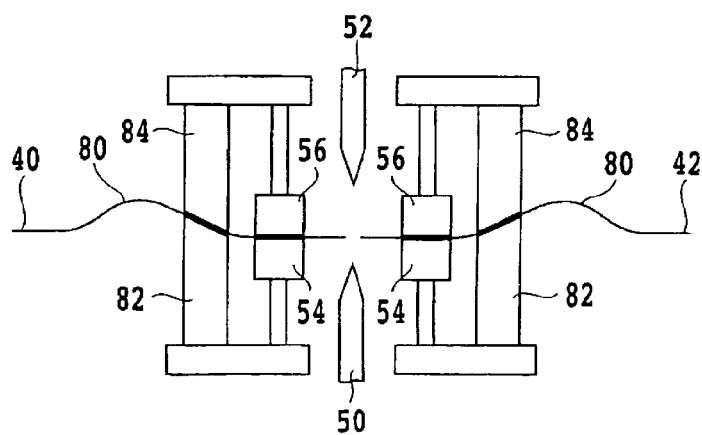
FIG. 13C is a view similar to FIG. 13B, showing a condition where the lifting bars are removed from the bent portions of the optical fibers.

Referring to FIGS. 13A to 13C, there is shown an extra length adjusting mechanism for the optical fibers. As shown in FIG. 13A, the optical fibers 40 and 42 are lifted by the lifting bars 60. If the optical fibers 40 and 42 are lowered to their horizontal positions without forming bent portions, the end portions of the optical fibers 40 and 42 overlap each other. When the upper clamps 56 are lowered as shown in FIG. 13B, the bent portions shown by 80 are formed at positions where the optical fibers 40 and 42 come into contact with the lifting bars 60. By forming the bent portions 80 of the optical fibers 40 and 42 as mentioned above, there is defined a gap between the end faces of the optical fibers 40 and 42.

When the lifting bars 60 are moved leftward as viewed in FIG. 6 to cancel the lifting of the rightmost optical fibers 40 and 42, the bent portions 80 are released from the lifting bars 60 as shown in FIG. 13C. In this condition, the upper and lower clamps 56 and 54 located on the opposite sides of the upper and lower electrodes 52 and 50 are moved toward the upper and lower electrodes 52 and 50 so that the gap between the end faces of the optical fibers 40 and 42 can be imaged by the CCD cameras 70 and 72. Before alignment of the optical axes of the optical fibers 40 and 42, pre-discharging is performed by using the electrodes 52 and 50 to thereby clean the end portions of the optical fibers 40 and 42. In this condition, the optical axes of the optical fibers 40 and 42 are aligned by using the CCD cameras 70 and 72 and image processing means 86 shown in FIG. 14A.

Figure 14A:
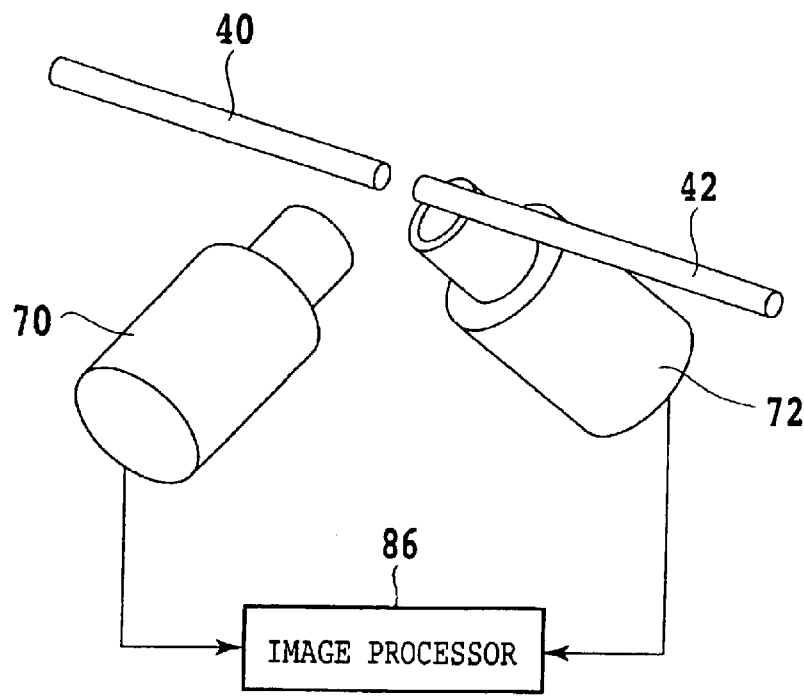
FIG. 14A is a schematic perspective view showing a positional relation between the optical fibers and CCD cameras in splicing the optical fibers.
Figure 14B:
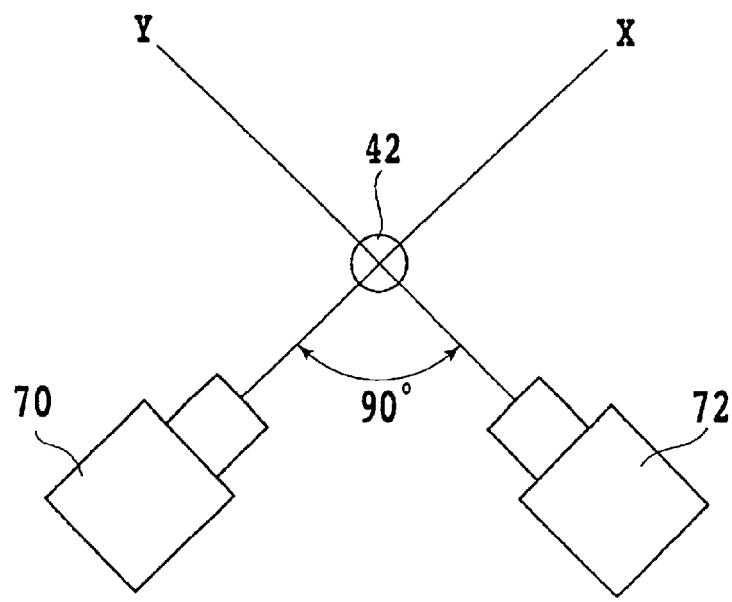
FIG. 14B is an elevation showing the arrangement of the CCD cameras so that their optical axes intersect at right angles.

FIG. 14A shows a positional relation between the optical fibers 40 and 42 and the CCD cameras 70 and 72 in splicing the optical fibers 40 and 42. As shown in FIG. 14B, the optical axes of the CCD cameras 70 and 72 intersect at right angles. In aligning the optical axes of the optical fibers 40 and 42, the end portions of the optical fibers 40 and 42 to be spliced are imaged by the CCD cameras 70 and 72. Images obtained by the CCD cameras 70 and 72 are processed by the image processing means 86, and the stepping motors 64, 66, and 68 constituting the fine adjusting mechanism are driven according to an output from the image processor 86, thereby performing the alignment of the optical axes of the optical fibers 40 and 42 to be spliced.

The operation of this preferred embodiment will now be described. First, the optical assembly 10 and the fiber sheets 12 are fixed to the tray 6 so that the optical fibers 40 and 42 in each pair are opposed to each other in close relationship. Then, the XY table feeding mechanism 8 is driven to move the tray 6 to a position where the optical assembly 10 and the fiber sheets 12 are located below the splicing head 14.

At this time, the end portions of the optical fibers 40 and 42 are lifted by the lifting bars 60 of the fiber lifting mechanism 16 as shown in FIGS. 6 to 8. Accordingly, it is possible to prevent that the optical fibers 40 and 42 opposed to each other may come into contact with each other to cause any damage. In the next step, the end portions of the optical fibers 40 and 42 to be spliced are clamped by the upper and lower clamps 56 and 54, and then positioned by performing coordinate specification. In this condition, pre-discharging is performed by the electrodes 50 and 52 to clean the end portions of the optical fibers 40 and 42.

In the next step, the lifting bars 60 are moved leftward as viewed in FIGS. 6 and 7 to release the rightmost pair of optical fibers 40 and 42 from the lifting bars 60, thereby freeing the bent portions formed by the lifting bars 60. Then, the right and left pairs of clamps 54 and 56 as viewed in FIG. 13C are moved toward each other as extending the bent portions of the optical fibers 40 and 42, so that the gap defined between the end faces of the optical fibers 40 and 42 is reduced to such an extent that the end portions of the optical fibers 40 and 42 can be imaged by the CCD cameras 70 and 72. In this condition, the facing end portions of the optical fibers 40 and 42 are imaged by the CCD cameras 70 and 72, and the images obtained are processed by the image processing means 86 to thereby perform the alignment of the optical axes of the optical fibers 40 and 42.

This alignment is performed by driving the fine adjusting mechanism including the stepping motors 64, 66, and 68. The amount of movement for the alignment is on the order of several micrometers. After ending the alignment, discharging is performed by the electrodes 50 and 52, and the clamps 54 and 56 are further moved toward each other as extending the bent portions to splice the optical fibers 40 and 42.

After ending the splicing of the rightmost pair of optical fibers 40 and 42 as viewed in FIG. 6, coordinate specification is performed to drive the XY table 4, thereby moving the tray 6 so that the end faces of the next pair of optical fibers 40 and 42 come between the electrodes 50 and 52. Thereafter, the steps mentioned above are performed to splice the next pair of optical fibers 40 and 42.

Figure 15A:
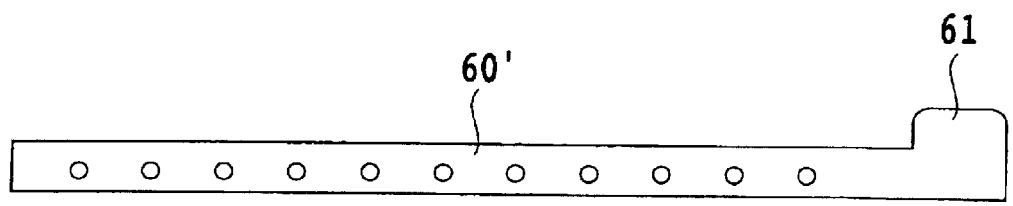
FIG. 15A is an elevational view of a partial lifting bar.
Figure 15B:
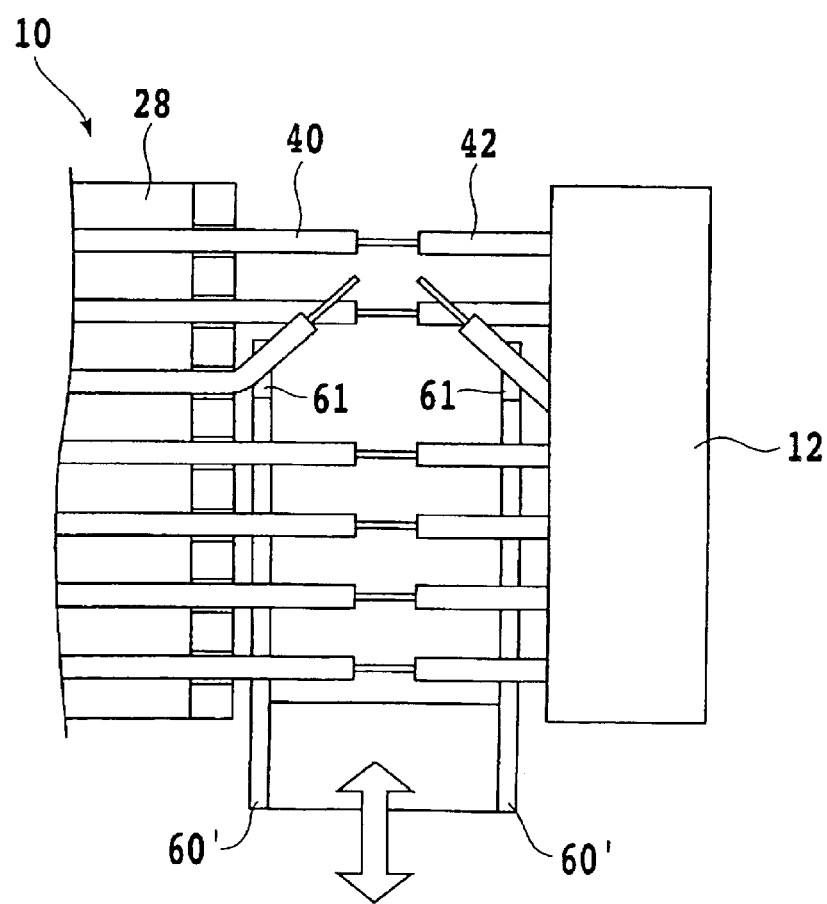
FIG. 15B is a plan view for illustrating the operation of the partial lifting bar.

Referring next to FIG. 15A, there is shown an elevational view of a partial lifting bar 60' suitable for use in repairing a spliced portion. In the case that the splicing of a pair of optical fibers has failed, this pair of optical fibers only must be spliced again for repairing purpose. In such a case, the partial lifting bar 60' having a projection 61 as shown in FIG. 15A is used. That is, only the optical fiber pair 40 and 42 to be repaired are lifted by the projections 61 of the partial lifting bars 60' as shown in FIG. 15B. Thereafter, above-mentioned method is performed to splice the intended optical fibers 40 and 42 again. The partial lifting bars 60' are vertically driven by using an air cylinder, for example.

According to the present invention, it is possible to position a pair of optical fibers to be spliced in a plane without the need for forming of the optical fibers, and it is further possible to splice a plurality of optical fiber pairs continuously and automatically. As a result, an optical module can be assembled efficiently.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical fiber splicer for splicing a plurality of first optical fibers arranged in spaced relationship with each other and a plurality of second optical fibers arranged in opposed relationship with said first optical fibers, said optical fiber splicer comprising:

an XY table movable in an X direction and a Y direction orthogonal to said X direction;

a tray mounted on said XY table;

means for fixing said first and second optical fibers to said tray so that said first and second optical fibers are opposed to each other in close relationship;

first and second clamp means for respectively clamping a selected one of said first optical fibers and a selected one of said second optical fibers to be spliced to said selected first optical fiber;

a first electrode extending vertically and movable vertically;

a second electrode aligned with said first electrode at a position above said first electrode, said second electrode extending vertically and movable vertically;

a first camera provided on one side of said first electrode in a direction orthogonal to a direction of extension of said selected first and second optical fibers;

a second camera provided on the other side of said first electrode opposite to said first camera in a direction orthogonal to said direction of extension of said selected first and second optical fibers; and means for processing images picked up by said first and second cameras.

2. The optical fiber splicer according to claim 1, further comprising a fiber lifting mechanism for lifting said, plurality of first and second optical fibers.

3. The optical fiber splicer according to claim 2, wherein said fiber lifting mechanism comprises:

a first lifting bar extending below said plurality of first optical fibers in a direction orthogonal to the direction of extension of said first optical fibers, said first lifting bar having a curved upper surface for bending said first optical fibers; and a second lifting bar extending below said plurality of second optical fibers in a direction orthogonal to the direction of extension of said second optical fibers, said second lifting bar having a curved upper surface for bending said second optical fibers.

4. The optical fiber splicer according to claim 3, wherein said first lifting bar can form a first bent portion in said selected first optical fiber in a condition where said selected first optical fiber is clamped by said first clamp means; and said second lifting bar can form a second bent portion in said selected second optical fiber in a condition where said selected second optical fiber is clamped by said second clamp means.

5. The optical fiber splicer according to claim 1, further comprising an electrode retracting mechanism for moving said first and second electrodes away from each other.

6. The optical fiber splicer according to claim 1, wherein each of said first and second clamp means comprises a lower clamp having a V groove and an upper clamp having a projection complementary in shape to said V groove.

7. The optical fiber splicer according to claim 6, wherein said lower clamp is movable both in a horizontal plane and in a vertical plane.

8. The optical fiber splicer according to claim 7, further comprising a clamp interlocking mechanism for interlocking said lower clamp and said upper clamp.

9. The optical fiber splicer according to claim 1, wherein said plurality of first optical fibers are connected at their one ends to a plurality of optical components mounted on a substrate; and said plurality of second optical fibers are sandwiched between first and second resin sheets of a fiber sheet and project from between said first and second resin sheets.

10. The optical fiber splicer according to claim 9, wherein said substrate has a pair of side walls each formed with a plurality of fiber positioning recesses, said first optical fibers being inserted in said fiber positioning recesses.

11. The optical fiber splicer according to claim 1, wherein said first and second cameras are located so that the optical axes of said first and second cameras intersect at right angles.

12. The optical fiber splicer according to claim 6, further comprising a fine adjusting mechanism provided integrally with said lower clamp in each of said first and second clamp means.

13. An optical fiber splicer for splicing at least one pair of optical fibers in a first group of plural optical fibers and a second group of plural optical fibers respectively opposed to said first group of plural optical fibers in a condition where a first gap is defined between the opposed end faces of said pair of optical fibers, said optical fiber splicer comprising:

deforming means for bending a part of at least said first group of optical fibers except said pair of optical fibers before splicing to thereby define a second gap larger than said first gap between the opposed end faces of said pair of optical fibers; and splicing means for splicing said pair of optical fibers.

14. The optical fiber splicer according to claim 13, wherein at least said first group of optical fibers except said pair of optical fibers includes an optical fiber adjacent to said pair of optical fibers.

15. An optical fiber splicing method comprising the steps of:

arranging a plurality of first optical fibers in spaced relationship with each other;

arranging a plurality of second optical fibers at one end of each of said second optical fibers in opposed relationship with one end of each of said first optical fibers;

clamping an end portion of a selected one of said first optical fibers and an end portion of a selected one of said second optical fibers to be spliced to said selected first optical fiber, and simultaneously forming bent portions near said end portions of said selected first and second optical fibers;

extending said bent portions of said selected first and second optical fibers clamped to thereby move the end faces of said selected first and second optical fibers toward each other;

performing pre-discharging by means of first and second electrodes extending vertically and aligned with each other to thereby clean the end portions of said selected first and second optical fibers clamped;

aligning the optical axes of said selected first and second optical fibers clamped; and performing discharging by means of said first and second electrodes to splice said selected first and second optical fibers clamped.

16. The optical fiber splicing method according to claim 15, further comprising the steps of:

clamping end portions of another pair of optical fibers adjacent--to said selected first and second optical fibers spliced; and splicing said another pair of optical fibers.

17. The optical fiber splicing method according to claim 15, wherein said step of aligning the optical axes comprises the steps of:

imaging the end portions of said selected first and second optical fibers by means of first and second cameras located so that the optical axes of said first and second cameras intersect at right angles; and processing images obtained by said first and second cameras.

18. An optical fiber splicing method comprising the steps of:

mounting a tray on an XY table;

fixing to said tray an optical assembly having a substrate, a plurality of optical components mounted on said substrate, and a plurality of first optical fibers connected at their one ends to said optical components and arranged in spaced relationship with each other;

fixing to said tray a fiber sheet having first and second resin sheets and a plurality of second optical fibers sandwiched between said first and second resin sheets so as to be opposed to said first optical fibers;

clamping an end portion of a selected one of said first optical fibers and an end portion of a selected one of said second optical fibers to be spliced to said selected first optical fiber, and simultaneously forming bent portions near said end portions of said selected first and second optical fibers;

extending said bent portions of said selected first and second optical fibers clamped to thereby move the end faces of said selected first and second optical fibers toward each other;

performing pre-discharging by means of first and second electrodes extending vertically and aligned with each other to thereby clean the end portions of said selected first and second optical fibers clamped;

aligning-the optical axes of said selected first and second optical fibers clamped; and performing discharging by means of said first and second electrodes to splice said selected first and second optical fibers clamped.

19. The optical fiber splicing method according to claim 18, further comprising the steps of:

horizontally moving said tray by means of said XY table after said splicing step;

clamping end portions of another pair of optical fibers adjacent to said selected first and second optical fibers spliced; and splicing said another pair of optical fibers.

20. A method of splicing at least one pair of optical fibers in a first group of plural optical fibers and a second group of plural optical fibers respectively opposed to said first group of optical fibers in a condition where first gap is defined between the opposed and faces of said pair of optical fibers, the method comprising the steps of:

bending a part of at least said first group of optical fibers except said pair of optical fibers before splicing to thereby define a second gap larger than said first gap between the opposed and faces of said pair of optical fibers; and splicing said pair of optical fibers.

* * * * *

UNITED STATES PATENT AND TRADEMARK OFFICE
CERTIFICATE OF CORRECTION

PATENT NO. : 6,890,109 B2
DATED : May 10, 2005
INVENTOR(S) : Tadao Arima et al.

It is certified that error appears in the above-identified patent and that said Letters Patent is hereby corrected as shown below:

Title page,
Item [56], References Cited, U.S. PATENT DOCUMENTS,
after "6,152,611 A" insert -- * --, and after "2004/0264892 A1" insert -- * --.
FOREIGN PATENT DOCUMENTS, change "395/95 X" to -- 385/95 X --.

Column 9,
Line 24, delete ",".

Column 10,
Line 58, after "adjacent" delete "--".

Column 12,
Line 3, after "aligning" delete "--".
Lines 20 and 25, change "and" to -- end --.

Signed and Sealed this

Seventh Day of February, 2006

JON W. DUDAS
*Director of the United States Patent and Trademark Office*